United States Patent
Yamazaki et al.

(10) Patent No.: US 10,422,621 B2
(45) Date of Patent: Sep. 24, 2019

(54) OPTICAL MEASUREMENT DEVICE HAVING A PLURALITY OF ROTARY SHAFTS AND DISPLACEMENT DETECTORS FOR DETECTING AXIAL DISPLACEMENT OF EACH ROTARY SHAFT AND USING THE DETECTED AXIAL DISPLACEMENT FOR THREE-DIMENSIONAL IMAGE CORRECTION

(71) Applicant: Adamant Namiki Precision Jewel Co., Ltd., Tokyo (JP)

(72) Inventors: Hiroshi Yamazaki, Kuroishi (JP); Eri Fukushima, Kuroishi (JP); Takuya Tateyama, Kuroishi (JP); Takafumi Asada, Kuroishi (JP)

(73) Assignee: Adamant Namiki Precision Jewel Co., Ltd., Tokyo (JP)

( * ) Notice: Subject to any disclaimer, the term of this patent is extended or adjusted under 35 U.S.C. 154(b) by 0 days.

(21) Appl. No.: 15/860,204

(22) Filed: Jan. 2, 2018

(65) Prior Publication Data
US 2018/0143000 A1     May 24, 2018

Related U.S. Application Data
(63) Continuation of application No. PCT/JP2016/069598, filed on Jul. 1, 2016.

(30) Foreign Application Priority Data
Jul. 3, 2015    (JP) ................................. 2015-134162

(51) Int. Cl.
*G01B 9/02*      (2006.01)
*G01D 5/26*      (2006.01)
(Continued)

(52) U.S. Cl.
CPC ....... *G01B 9/02023* (2013.01); *G01B 9/0205* (2013.01); *G01B 9/0209* (2013.01);
(Continued)

(58) Field of Classification Search
CPC ............ G01B 9/02023; G01B 11/2441; G01B 9/0209; G01B 9/02076; G01B 9/0205;
(Continued)

(56) References Cited

U.S. PATENT DOCUMENTS

| | | | | |
|---|---|---|---|---|
| 6,134,003 A | * | 10/2000 | Tearney | A61B 1/00096 356/479 |
| 9,207,064 B2 | * | 12/2015 | Inoue | G01B 9/02004 |
| 2011/0164255 A1 | * | 7/2011 | Konno | A61B 5/0062 356/479 |

FOREIGN PATENT DOCUMENTS

| | | |
|---|---|---|
| JP | H05-272929 A | 10/1993 |
| JP | H11-281331 A | 10/1999 |

(Continued)

OTHER PUBLICATIONS

International Search Report issued in PCT/JP2016/069598; dated Sep. 6, 2016.

*Primary Examiner* — Hwa Andrew Lee
(74) *Attorney, Agent, or Firm* — Studebaker & Brackett PC

(57) ABSTRACT

Provided is an optical measurement device configured so that a high-accuracy three-dimensional image can be obtained. An emission angle of a ray of light is changed in such a manner that the rotation frequencies of two motors configured to rotatably drive a first optical path changing unit and a second optical path changing unit is controlled. The ray of light is emitted to a front three-dimensional region, and reflected light is obtained. Then, calculation is made by a computer, and in this manner, three-dimensional data on a measurement target object is obtained. The amount
(Continued)

(vibration amount) of axial backlash or play of a rotary mechanism, such as a motor shaft, along which the ray of light is emitted is measured in real time, and such a backlash or play amount is subtracted from a three-dimensional image obtained by the computer. Consequently, a high-accuracy three-dimensional image is obtained.

6 Claims, 15 Drawing Sheets

(51) Int. Cl.
  *G01B 11/24* (2006.01)
  *G02B 23/24* (2006.01)
  *G02B 26/10* (2006.01)
(52) U.S. Cl.
  CPC ..... *G01B 9/02056* (2013.01); *G01B 9/02069* (2013.01); *G01B 9/02076* (2013.01); *G01B 9/02091* (2013.01); *G01B 11/2441* (2013.01); *G01D 5/266* (2013.01); *G02B 23/2453* (2013.01); *G02B 26/108* (2013.01); *G01B 2290/35* (2013.01)

(58) Field of Classification Search
  CPC ............ G01B 9/02069; G01B 9/02056; G01B 9/02091; G01B 2290/35; G02B 26/108; G02B 23/2453; G01D 5/266
  See application file for complete search history.

(56) References Cited

FOREIGN PATENT DOCUMENTS

| | | |
|---|---|---|
| JP | 2002-000550 A | 1/2002 |
| JP | 3885114 B2 | 2/2007 |
| JP | 4520993 B2 | 8/2010 |
| JP | 2011-017615 A | 1/2011 |
| JP | 2015-232539 A | 12/2015 |

\* cited by examiner

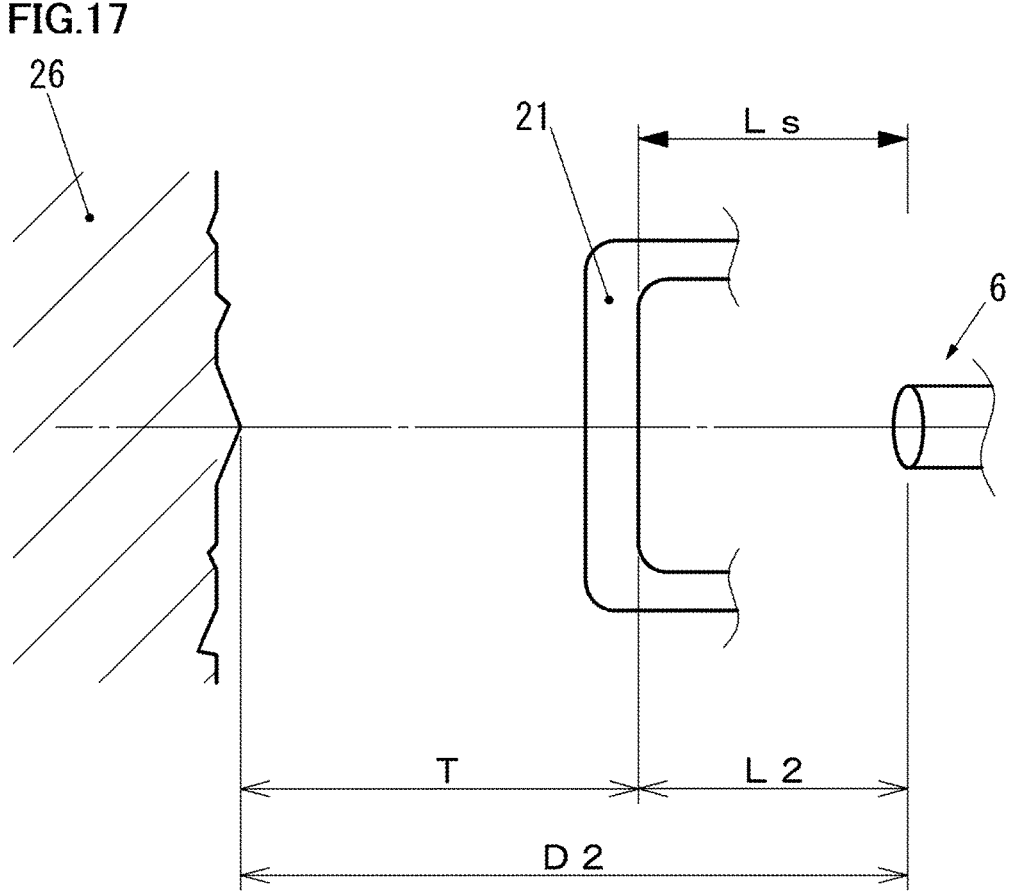

OPTICAL MEASUREMENT DEVICE HAVING A PLURALITY OF ROTARY SHAFTS AND DISPLACEMENT DETECTORS FOR DETECTING AXIAL DISPLACEMENT OF EACH ROTARY SHAFT AND USING THE DETECTED AXIAL DISPLACEMENT FOR THREE-DIMENSIONAL IMAGE CORRECTION

TECHNICAL FIELD

The present invention relates to an optical measurement device configured such that an optical sensor is inserted into a deep hole of a measurement target object such as a mechanical component to three-dimensionally capture reflected light for observation and measurement of geometric accuracy of a deep hole bottom portion, such as dimensions and flatness.

BACKGROUND ART

For example, finished dimensions, the level of geometric accuracy, and the like for a cylinder or a fuel injection nozzle of an automobile engine greatly influence power performance and a fuel consumption efficiency of an automobile. For testing, a contact-type measurement machine such as a roundness measurement machine or a surface roughness meter has been generally used. However, in recent years, an optical non-contact-type measurement machine has been introduced for the purpose of not damaging a measurement target object.

A unit configured to obtain shape data on an inner surface of the measurement target object in a non-contact state employs, for example, the image diagnosis technique (the optical imaging technique) of three-dimensionally emitting laser light and capturing interfering light from reflected light, thereby performing numerical processing for a three-dimensional shape by a general method such as a heterodyne method to measure the geometric accuracy.

In a medical field, a method for providing an observable tomographic image of an affected area of an inner portion of a human body, such as X-ray CT, magnetic resonance imaging, and an optical coherence tomography (OCT) image for emitting far-red light with excellent permeability and capturing reflected light to fetch, utilizing coherency of light, numerical data on a three-dimensional shape, has been studied and utilized.

A representative structure of an observation device employing the technique of irradiating an inner peripheral surface of a mechanical device or a mechanical component with a ray of light to observe or measure the inner surface is as described in Patent Literatures 1 to 3, for example.

In an OCT endoscope described in Patent Literature 1, rotation force of a motor is, as illustrated in FIG. 8 of this literature, transmitted to a rotary shaft through a belt, and is further transmitted to a lens unit through a flexible shaft including, e.g., an optical fiber passing through the inside of a tube-shaped optical sheath. However, in this configuration, a two-dimensional tomographic image illustrated in FIG. 26 of this literature can be obtained, but no three-dimensional image can be obtained.

An OCT endoscope described in Patent Literature 2 employs an OCT three-dimensional image system. In this system, an elongated tube-shaped catheter is inserted into an annular guide catheter illustrated in FIG. 1 of this literature, and the catheter includes an optically-connected rotatable and slidable optical fiber or core. A body tissue is irradiated in such a manner that the optical fiber is rotated while being moved in a length direction as illustrated in FIG. 3 of this literature, and an analysis image is observed. However, in this configuration, there is a problem that abrasion powder is caused due to friction between an inner peripheral surface of the catheter and an outer peripheral surface of a drive shaft. Moreover, due to friction, warpage, torsion, and the like of the drive shaft, an uneven rotation speed, a delay in rotation transmission, torque loss fluctuation, and the like are caused. For these reasons, the resultant analysis image is distorted, and required accuracy for spatial resolution and definition cannot be obtained.

A technique described in Patent Literature 3 employs an endoscope. In the endoscope, a motor (7, 8) respectively rotates a sheath tube (5, 6) and a wedge prism (3, 4). In this manner, an emission light ray direction is changed forward so that a portion to be observed upon intravital observation can be freely changed.

However, in this configuration, the rotation frequencies of the two motors are not synchronized with each other, and no rotation detection pulse from the motors is utilized. For these reasons, only a change in the light ray direction can be performed. Thus, a ray of light cannot be emitted in a spiral pattern. For this reason, a three-dimensional image cannot be obtained by capturing and calculation of reflected light from the front by a computer. Moreover, the sheath tube is rotatable, but rotation backlash or play (e.g., 10 microns) in an axial direction (a longitudinal direction) is allowed. For this reason, the sheath tube rotates while vibrating in the axial direction. A distance between a sensor unit and a testing target is changed by the distance of the backlash or play. For this reason, an accurate distance to the testing target cannot be measured, and image definition is low.

CITATION LIST

Patent Literature

PATENT LITERATURE 1: Japanese Patent No. 3885114
PATENT LITERATURE 2: Japanese Patent No. 4520993
PATENT LITERATURE 3: JP-A-2002-550

SUMMARY OF THE INVENTION

Problems to be Solved by the Invention

The present invention has been made in view of the above-described typical situation, and an object of the present invention is to provide an optical measurement device configured to obtain a high-accuracy three-dimensional image in the following manner: a ray of light is emitted forward in, e.g., a spiral pattern according to programming, and then, the captured reflected light is used for a computer to fetch a three-dimensional shape; and the amount (a slight distance) of axial backlash or play of a rotary body configured to emit the ray of light is detected and subtracted.

Solution to the Problems

According to one technique for solving the above-described problems, in an optical measurement device configured to three-dimensionally emit a ray of light from a tip end side of a probe to obtain a three-dimensional image, the probe includes a translucent reference plate, a plurality of motors, and a rotary-side optical fiber and/or an optical path changing unit rotatable together with a rotary shaft of each motor, and the probe has a displacement detection unit configured to detect slight displacement of each rotary shaft in an axial direction thereof.

Effects of the Invention

According to the present invention, an optical measurement device can be provided, which is configured to detect the amount (slight distance) of axial backlash or play of a rotary scanning mechanism configured to emit a ray of light and subtract such an amount from collected three-dimensional image data, thereby accurately obtaining a high-accuracy three-dimensional image.

BRIEF DESCRIPTION OF THE DRAWINGS

FIG. 17 is a view for describing lengths measured for the optical measurement device of the present invention upon measurement.

DESCRIPTION OF THE EMBODIMENTS

Figure 1:
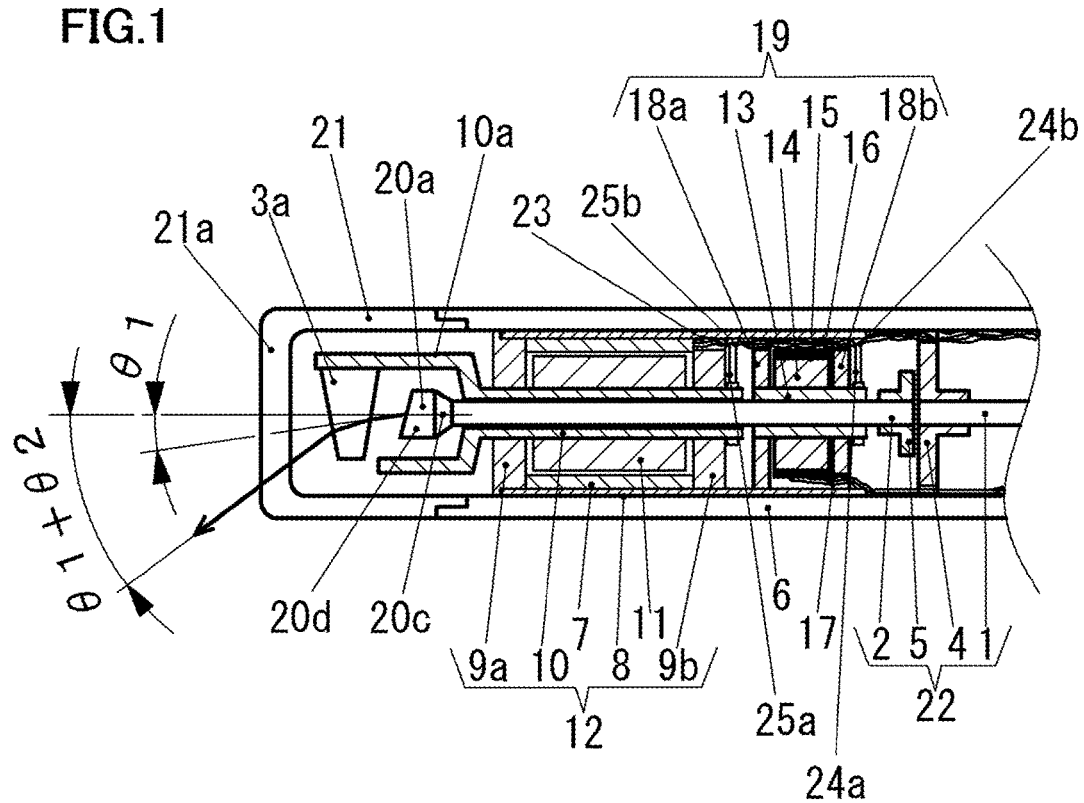
FIG. 1 is a sectional view of a main portion of an optical probe according to an embodiment of an optical measurement device of the present invention.

A first feature of an optical measurement device of the present embodiment is that in an optical measurement device configured to three-dimensionally emit a ray of light from a tip end side of a probe to obtain a three-dimensional image, the probe includes a translucent reference plate, a plurality of motors, and a rotary-side optical fiber and/or an optical path changing unit rotatable together with a rotary shaft of each motor, and the probe has a displacement detection unit configured to detect slight displacement of each rotary shaft in an axial direction thereof.

According to this configuration, rotation vibration of the motors can be detected in real time, and a measurement error due to backlash of a rotary scanning section can be corrected. This leads to high-accuracy measurement.

A second feature is that the displacement detection unit of the optical measurement device uses, as a reference value, preset three-dimensional position information on the translucent reference plate, i.e., three-dimensional information on a distance to each point of the translucent reference plate, and detects, as a displacement, a difference between an actual measurement value of measured distance data obtained during rotation of each motor and the preset reference value.

With this configuration, the amount of backlash or vibration in the axial direction can be, in real time, removed from shape data on a testing target object bottom surface by a simple configuration, leading to accurate and precise measurement of accuracy of the hole bottom surface.

A third feature is that an exterior of a main body of the probe of the optical measurement device is a tube, and a first motor and a second motor are arranged in the tube. The optical path changing unit includes a first optical path changing unit configured to rotate together with a rotary shaft of the first motor, and a second optical path changing unit configured to rotate together with a rotary shaft of the second motor. A stationary-side optical fiber is built in the tube, and the stationary-side optical fiber and the rotary-side optical fiber are optically connected together through a rotary optical connector. The first optical path changing unit is positioned on a tip end side of the stationary-side optical fiber, and is rotatably driven by the first motor such that the ray of light is rotatably emitted forward with an angle with respect to a rotation center. The second optical path changing unit is integrally disposed on a tip end side of the rotary-side optical fiber, is positioned between the stationary-side optical fiber and the first optical path changing unit, and is rotatably driven by the second motor such that the ray of light is rotatably emitted with an optical path being inclined with a slight angle with respect to the rotation center and the first optical path unit is irradiated with the ray of light. The ray of light is transmitted from the stationary-side optical fiber through the rotary optical connector, the second optical path changing unit, and the first optical path changing unit in this order, and then, is emitted forward.

According to this configuration, backlash and rotation vibration of the first and second motors in the axial direction can be detected in real time, and the measurement error due to backlash of the rotary scanning section can be corrected. This leads to high-accuracy measurement.

A fourth feature is that a first pulse generation unit configured to generate at least one or more pulses in a single rotation according to the rotation angle of the first motor, and a second pulse generation unit configured to generate at least one or more pulses in a single rotation according to the rotation angle of the second motor are included. A control unit configured to adjust the rotation speeds of the first and second motors based on the pulses from the first and second pulse generation units is included. By rotation made such that a relationship between the rotation speed N1 of the first motor and the rotation speed N2 of the second motor satisfies N2 =N1−X [rotations/second], the ray of light is emitted forward from the first optical path changing unit at the rotation speed N1 [rotations/second], and the emission angle of the ray of light with respect to the rotation center is changed at a speed X [rounds/second].

According to this configuration, the ray of light can be emitted forward across a wide area depending on a combination of the rotation angles of the first and second optical path changing units.

A fifth feature lies in the method for revising the optical measurement device having the above-mentioned features. Specifically, a revision block formed of, e.g., a flat plate is disposed at the front of the probe of the optical measurement device. When a ray of light is three-dimensionally emitted during rotation of the probe, an inter-target distance T is T=(D2−L2), and a value Ls as Ls=(Ds−T) is used as a reference value of the translucent reference plate, where for each point, a given true distance to the revision block is Ds, a pre-revised measurement value by the probe is D2, and a measured distance to the reference plate is L2.

By this revision method, an absolute reference for measurement and correction is obtained, and therefore, high-accuracy measurement can be performed using the optical measurement device.

A sixth feature lies in an optical measurement method for three-dimensionally emitting a ray of light to obtain a three-dimensional image. Specifically, the ray of light is emitted to a testing target (a measurement target object) through a translucent reference plate while the direction of the ray of light is being changed by driving an optical path changing unit. Then, a signal on a measured distance to the translucent reference plate and a signal on a measured distance to the testing target are obtained from reflected light. Subsequently, a difference between the value of the signal on the measured distance to the testing target and a preset reference value as three-dimensional distance information is used as a displacement, and in this manner, the measured distance to the testing target is corrected.

According to this measurement method, a measurement error can be corrected, leading to high-accuracy three-dimensional measurement.

Embodiment

Next, a preferable embodiment of the present invention will be described with reference to the drawings.

FIGS. 1 to 15 illustrate an embodiment of an optical measurement device of the present invention.

FIG. 1 is a sectional view of an optical probe of the optical measurement device of the embodiment of the present invention, and a stationary-side optical fiber 1 configured to guide a ray of light from a back end side to a tip end side of the probe is inserted into the substantially center of a sufficiently-long tube (a catheter) 6.

A rotary-side optical fiber 2 is rotatably provided on a tip end side of the stationary-side optical fiber 1. On a tip end side of the rotary-side optical fiber 2, a first optical path changing unit 3 including, e.g., a lens or a prism in such a shape that both surfaces of a substantially circular columnar transparent body are cut along substantially flat surfaces not parallel to each other is, independently of the rotary-side optical fiber 2, attached to rotate by a first motor 12. It is configured such that the ray of light is, by rotation of the first optical path changing unit 3, rotatably emitted forward with an angle of θ1+θ2 with respect to an axis in the figure, for example.

A second optical path changing unit 20 configured to collect the ray of light having transmitted through the stationary-side optical fiber 1 and to rotatably emit the ray of light to the first optical path changing unit 3 with a slight angle (θ1) with respect to the axis is attached to a tip end of the rotary-side optical fiber 2. In FIG. 1, the second optical path changing unit 20 is formed of a combination of a conical collecting lens 20c and a prism 20d, for example.

The rotary-side optical fiber 2 and the stationary-side optical fiber 1 have end surfaces processed to the right angle, and face each other with a slight distance of about 5 µm. Including a rotary light shielding plate 5 and an optical fiber fixture 4, the rotary-side optical fiber 2 and the stationary-side optical fiber 1 form a rotary optical connector 22. A high transmittance is maintained between the rotary-side optical fiber 2 and the stationary-side optical fiber 1, and the rotary-side optical fiber 2 and the stationary-side optical fiber 1 are optically connected together with little loss.

The first motor 12 is built in the tube 6, and a rotor magnet 11 is attached such that a hollow rotary shaft 10 supported by first bearings 9a, 9b rotates. In the first motor 12, voltage is, through an electric wire 23, applied to a motor coil 7 attached to the inside of a motor case 8. The first optical path changing unit 3 is rotatable with the first optical path changing unit 3 being integrally attached to a holder portion 10a of the hollow rotary shaft 10.

In a second motor 19, a second rotary shaft 13 supported by second bearings 18a, 18b is, with light pressure, fitted into a hole opening at the substantially center of a vibrator 14, and stable friction force between the vibrator 14 and the second rotary shaft 13 is generated by elasticity or spring properties of the vibrator 14. The second rotary shaft 13 of the second motor 19 is fixed to a center hole of the rotary-side optical fiber 2. Voltage is applied to a pattern electrode 16 and an electrostrictive element 15 through a provided electric wire 17, and therefore, the second optical path changing unit 20 is rotated. Rotation of the vibrator 14 relative to the motor case 8 is restricted, and the electric wire 17 functions as an anti-rotation lock in the case of the simplest structure. Needless to say, the second motor may be a motor including the same rotor magnet and coil as those of the first motor, and the first motor may be a motor including the same vibrator as that of the second motor.

Figure 4:
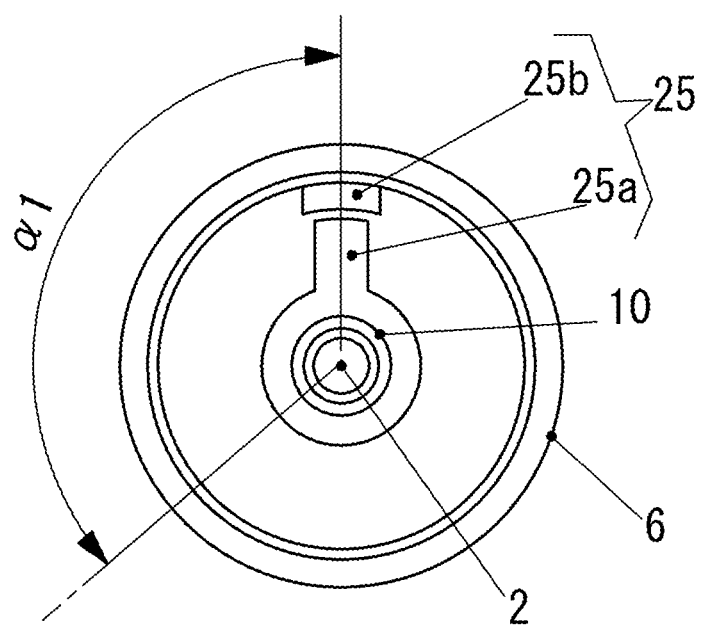
FIG. 4 is a view for describing a rotation pulse generation section of a first motor of the optical probe of the optical measurement device of the present invention.
Figure 5:
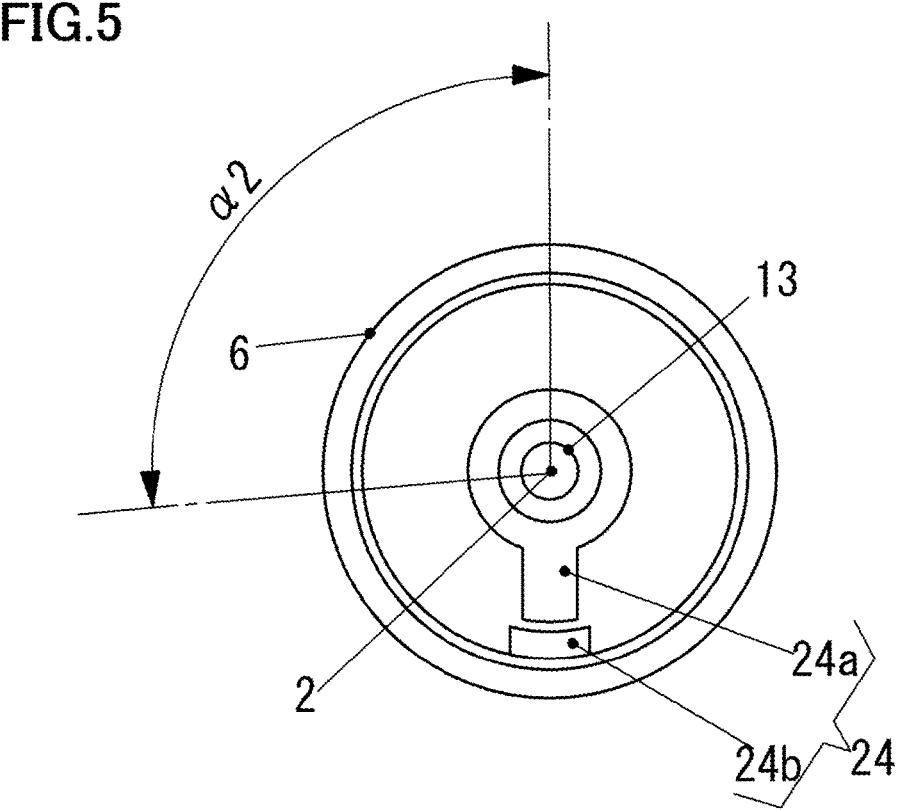
FIG. 5 is a view for describing a rotation pulse generation section of a second motor of the optical probe of the optical measurement device of the present invention.

The first motor 12 is provided with a first pulse generation unit 25 including a rotary member 25a and a stationary member 25b as illustrated in FIG. 4. Similarly, the second motor 19 is provided with a second pulse generation unit 24 including a rotary member 24a and a stationary member 24b as illustrated in FIG. 5. Each of these units is configured to generate a single pulse signal or multiple pulse signals per rotation according to rotation of a corresponding one of the first and second motors. For these pulse generation principles, a magnetic sensor such as an induction coil or a Hall element or an optical sensor including an optical shutter and an optical sensor is used, for example.

In FIG. 1, a translucent reference plate 21 made of a material through which the ray of light can be transmitted, such as glass, quartz, or sapphire, is integrally attached to the tube 6 at the front of the first optical path changing unit 3 configured to emit the ray of light. As necessary, a flat plate portion 21a or a substantially spherical portion is formed at the translucent reference plate 21. The flat plate portion 21a does not have a constant thickness, but the thickness of the flat plate portion 21a is, as necessary, changed for a lens function. Moreover, a coating and the like for reducing surface reflection and minimizing total reflection of the ray of light to enhance the transmittance is applied to the optical fiber fixture 4 as necessary.

Figure 2:
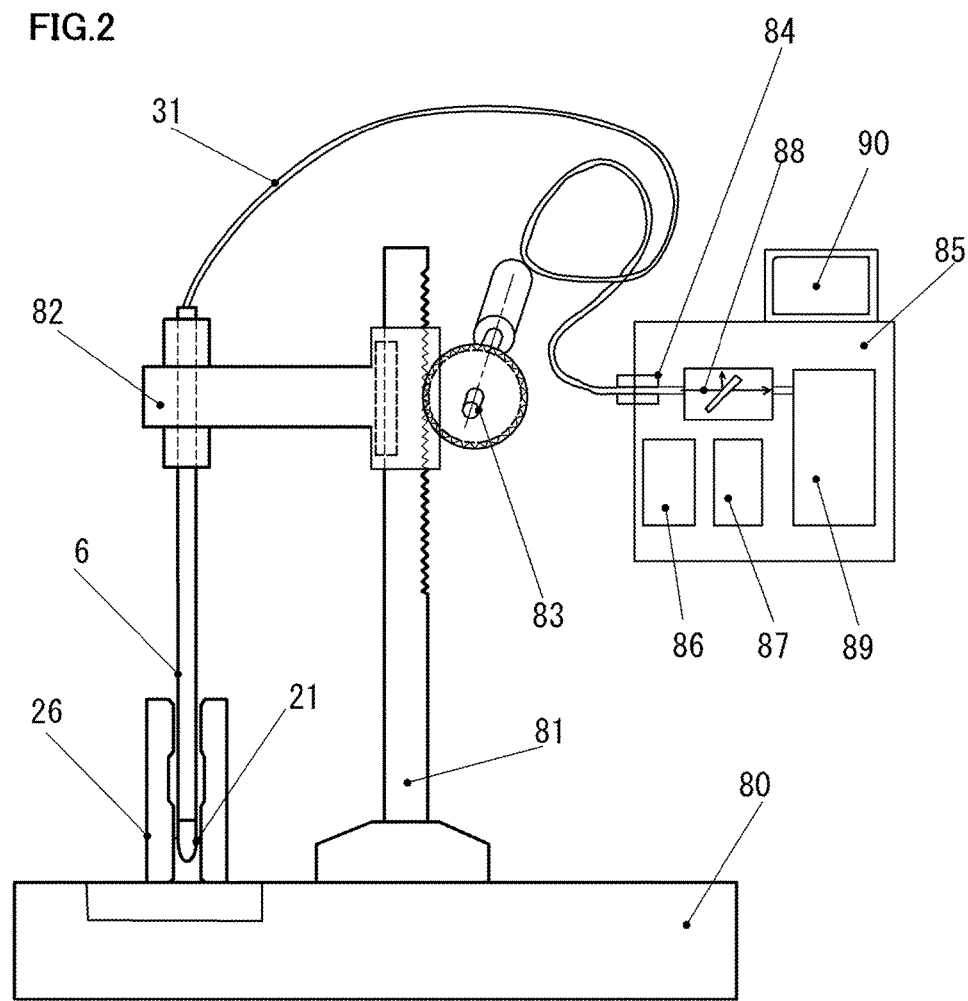
FIG. 2 is a view of a configuration of the optical measurement device of the present invention.
Figure 3:
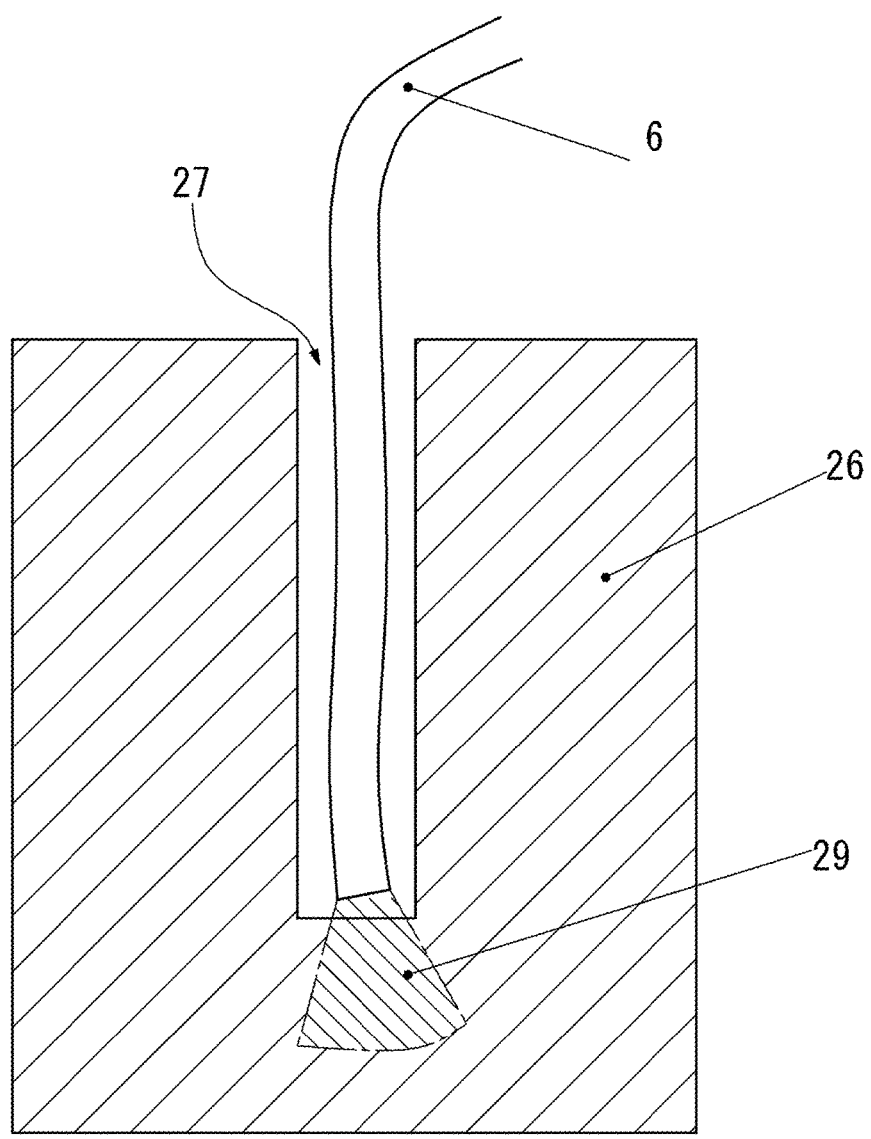
FIG. 3 is a view for describing scanning of a deep hole by the optical probe of the optical measurement device of the present invention.

In the first motor 12 of FIG. 1 in the optical measurement device illustrated in FIG. 2, a tip end portion of the tube 6 is, as illustrated in FIG. 3, inserted into a hole 27 of a measurement target object 26, and emits the ray of light in a tip end direction 29.

Rotary driving is made by a power supply from a motor driver circuit 86 of FIG. 2, and the second motor 19 is rotatably driven by voltage application from a second motor driver circuit 87. Moreover, the first motor 12 adjusts a rotation speed thereof by the pulse signal from the first pulse generation unit 25 illustrated in FIG. 4, and the second motor 19 can be adjusted to a preset rotation speed value by the pulse signal from the second pulse generation unit 24 illustrated in FIG. 5.

Next, characteristic features and advantageous effects of the optical measurement device of FIGS. 1 to 5 mentioned above will be described in detail.

In FIG. 2, a stand 81 on a base 80 is provided with a slider 82 configured to move up and down by a slider motor 83. A ray of light such as far-red light or laser is emitted from a light source in a main body 85, and passes through a connection portion 84. Then, the ray of light is guided into the slider 82, and advances through the stationary-side optical fiber 1 in the tube 6.

In FIG. 1, the ray of light passes from the stationary-side optical fiber 1 to the rotary optical connector 22, and is emitted after having passed through the rotary-side optical fiber 2, the second optical path changing unit 20, and the first optical path changing unit 3a in this order. The far-red light further passes through the translucent reference plate 21. The ray of light reflected from a surface of the measurement target object passes, in this order, the translucent reference plate 21, the first optical path changing unit 3a, the second optical path changing unit 20a, the rotary-side optical fiber 2, the rotary optical connector 22, and the stationary-side optical fiber 1 in the opposite direction of the above-described optical path, and then, is guided to an optical coherence analysis section 88 of FIG. 2.

Figure 12:
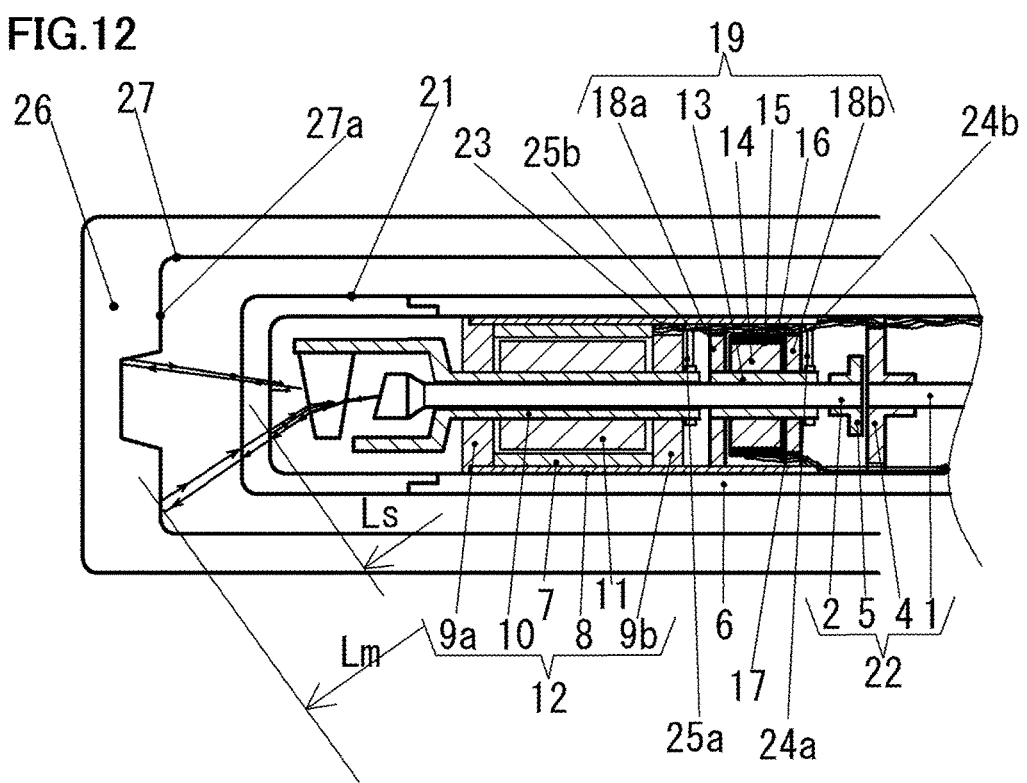
FIG. 12 is a view for describing operation of the optical probe of the optical measurement device of the present invention.
Figure 13:
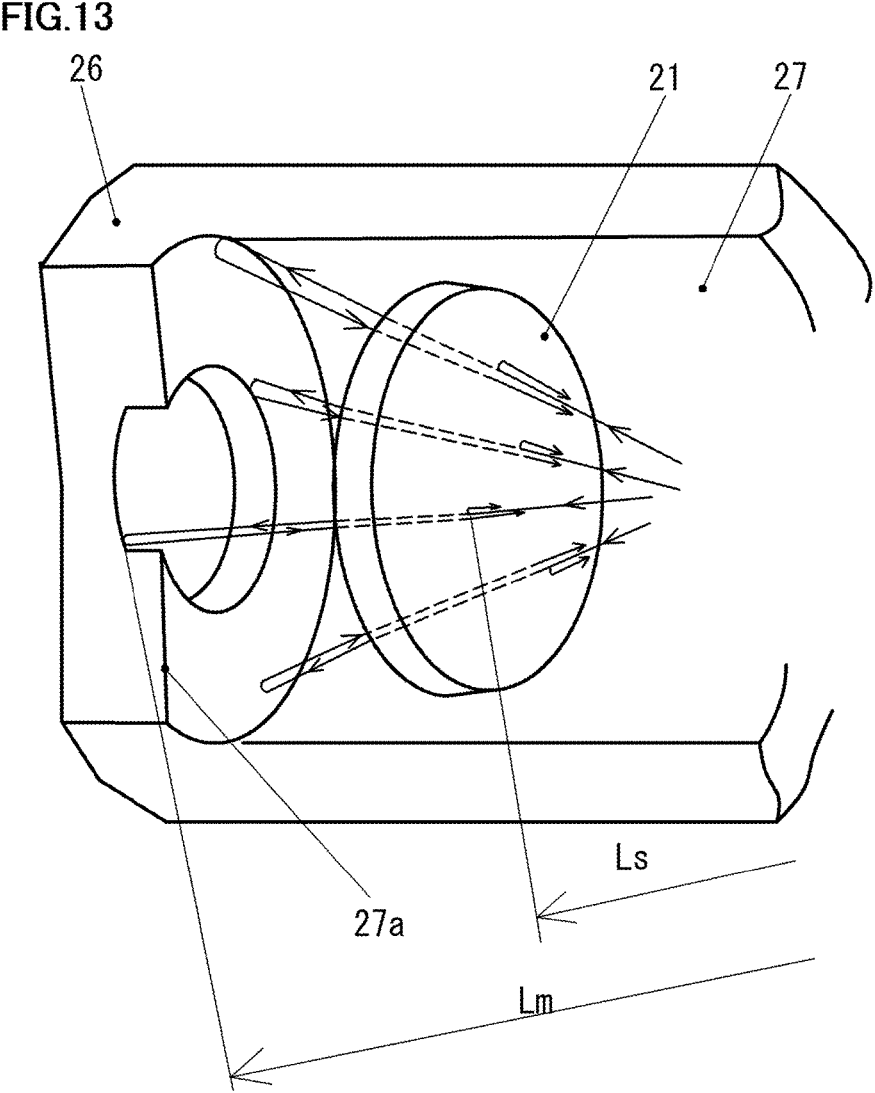
FIG. 13 is a view for describing the emission area of the optical probe of the optical measurement device of the present invention.

In FIGS. 12 and 13, the ray of light is emitted to a bottom portion of the deep hole 27 of the measurement target object 26. In this manner, digital data on the three-dimensional shape of a surface 27a is fetched for measurement of geometric accuracy of the bottom portion of the hole and observation on the presence or absence of an internal defect by means of a three-dimensional image.

In FIG. 1, power is supplied through the electric wire 23, and the first motor 12 rotates at a constant speed within a range of about 900 to 20,000 rpm. The ray of light guided from the stationary-side optical fiber 1 passes through the rotary optical connector 22 and the rotary-side optical fiber 2, and then, is emitted from the second optical path changing unit 20a. The ray of light is refracted on the substantially flat surface of the first optical path changing unit 3a, and changes its direction to a direction with a certain angle (a downward direction with an angle of θ1+θ2 as indicated by an arrow in FIG. 1). In this manner, the ray of light is rotatably emitted. In this state, the angle α1 of the first pulse generation unit 25 of the first motor 12 of FIG. 4 is zero degree, and the angle α2 of the second pulse generation unit 24 of the second motor 19 of FIG. 5 is also zero degree. A phase difference between these two angles is 0 degree, where the phase difference is represented by (α1−α2).

In this state, a light ray emission direction is greatly bent with respect to the axis, and an emission angle is in the downward direction with (θ1+θ2).

Figure 6:
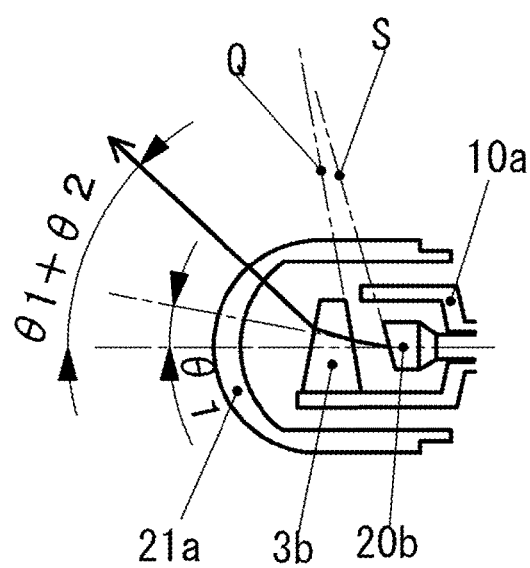
FIG. 6 is a view for describing operation of the optical probe of the optical measurement device of the present invention.

Next, when the first optical path changing unit 3 and the second optical path changing unit 20 rotate at the same rotation speed and move to positions which are 180 degrees opposite to those of FIG. 1 as indicated by 3b and 20b in the figure, the ray of light is, as illustrated in FIG. 6, rotatably emitted as follows: the ray of light is emitted from the second optical path changing unit 20b, and is refracted on the substantially flat surface of the first optical path changing unit 3b such that the direction of the ray of light is changed to a direction with a certain angle (an upward direction with an angle of θ1+θ2 as indicated by an arrow in FIG. 6). In this state, the angle α1 of the first pulse generation unit 24 of the first motor 12 is 180 degrees, and the angle α2 of the second pulse generation unit 24 of the second motor 19 is also 180 degrees. A phase difference (α1−α2) between these two angles is 0 degree as in FIG. 6. In this state, the light ray emission direction is greatly belt with respect to the axis, and the emission angle is in the upward direction with (α1+α2).

In FIG. 6, the angle Q of the substantially flat surface of the first optical path changing unit 3b and the angle S of a surface of the prism 20d of the second optical path changing unit 20 are set such that these surfaces are not parallel to each other and that, e.g., an angle of 5 degrees or more is formed between these surfaces. This is because the resultant three-dimensional image data might be degraded due to total reflection of the ray of light when the above-described surfaces are parallel to each other. As long as it is designed such that the first and second optical path changing units are not parallel to each other with the rotation angle phase difference (α1−α2) between the first and second optical path changing units being zero degree, a favorable image can be obtained in any state without concerns on parallelization of the first and second optical path changing units. Note that in FIGS. 6 to 8, the translucent reference plate forms a hemispherical surface, but may be a flat plate.

Figure 7:
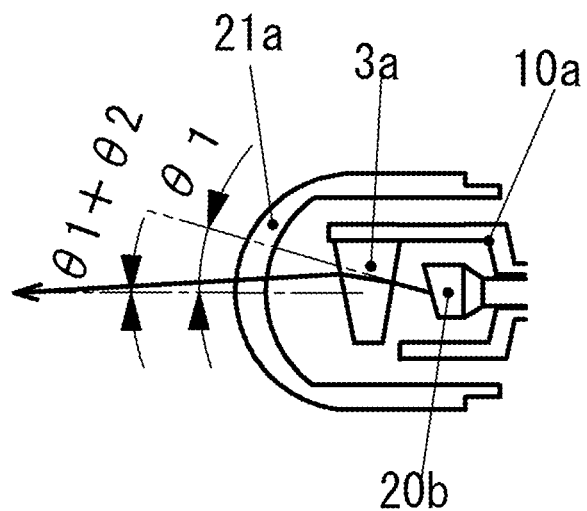
FIG. 7 is a view for describing operation of the optical probe of the optical measurement device of the present invention.

Next, FIG. 7 illustrates a state when the phase angle is changed in such a manner that the rotation speeds of the first optical path changing unit 3a and the second optical path changing unit 20a are differentiated from each other.

In FIG. 7, the ray of light emitted from the second optical path changing unit 20b with an angle with respect to the axis is refracted on the substantially flat surface of the first optical path changing unit 3a, and changes its direction to the opposite angle direction. As a result, the ray of light is rotatably emitted substantially in parallel to the axis substantially on the axis. In this state, the angle α1 of the first pulse generation unit 25 of the first motor 12 is zero degree, and the angle α2 of the second pulse generation unit 24 of the second motor 19 is −180 degrees due to a delay in rotation. A phase difference (α1−α2) between these two angles is +180 degrees. In this state, the light ray emission angle is (θ1+74 2)≈zero degree.

Figure 8:
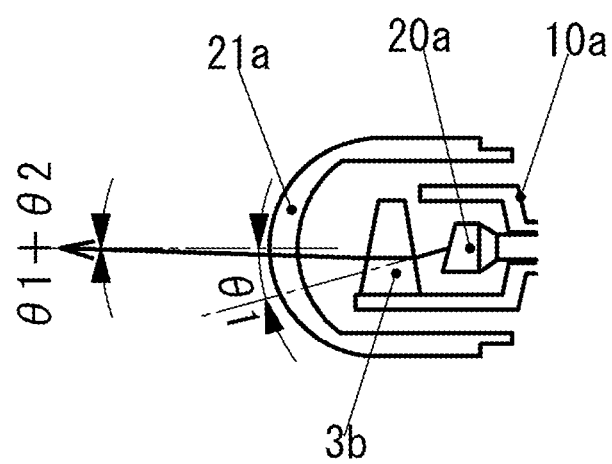
FIG. 8 is a view for describing operation of the optical probe of the optical measurement device of the present invention.

Next, FIG. 8 illustrates a state when the first optical path changing unit 3a and the second optical path changing unit 20a have rotated, with the same rotation frequency, to positions which are 180 degrees opposite to those in the state of FIG. 7.

In FIG. 8, the ray of light emitted from the second optical path changing unit 20a with an angle with respect to the axis is refracted on the substantially flat surface of the first optical path changing unit 3b, and changes its direction to the opposite angle direction. As a result, the ray of light is rotatably emitted substantially in parallel to the axis substantially on the axis. In this state, the angle α1 of the first pulse generation unit 25 of the first motor 12 is 180 degrees, and the angle α2 of the second pulse generation unit 24 of the second motor 19 is zero degree due to a delay in rotation. A phase difference (α1−α2) between these two angles is +180 degrees. In this state, the light ray emission angle is also (θ1+θ2)≈zero degree as in FIG. 7.

Figure 9:
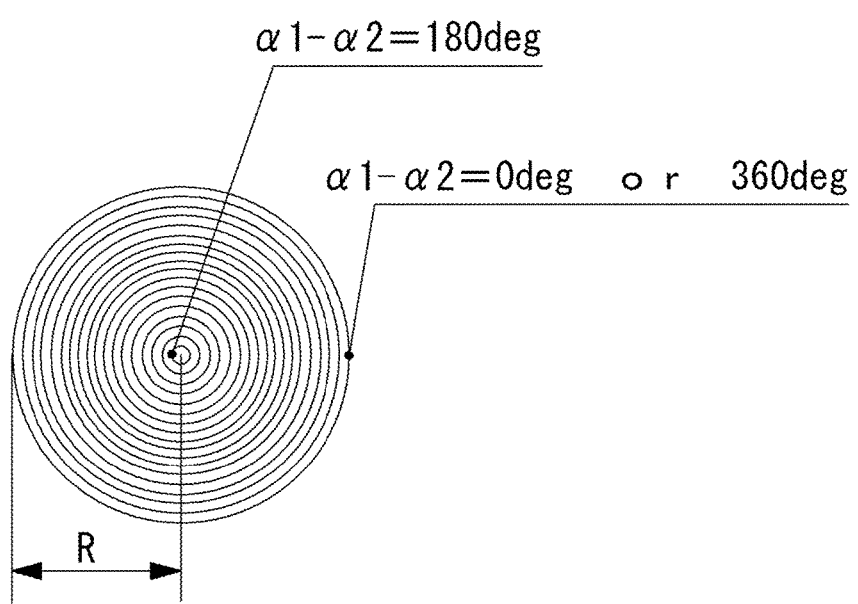
FIG. 9 is a view for describing an emission area of the optical probe of the optical measurement device of the present invention.

FIG. 9 illustrates, as viewed in a plane, the rotation phase angle (α1−α2) and the forward light ray emission direction as described with reference to FIGS. 1 to 8. An irradiation direction changes due to the phase difference (α1−α2) between the angle α1 of the first pulse generation unit 25 of the first motor 12 and the angle α2 of the second pulse generation unit 24 of the second motor 19, and the ray of light is emitted forward across a front area indicated by a radius R in the figure.

Figure 10:
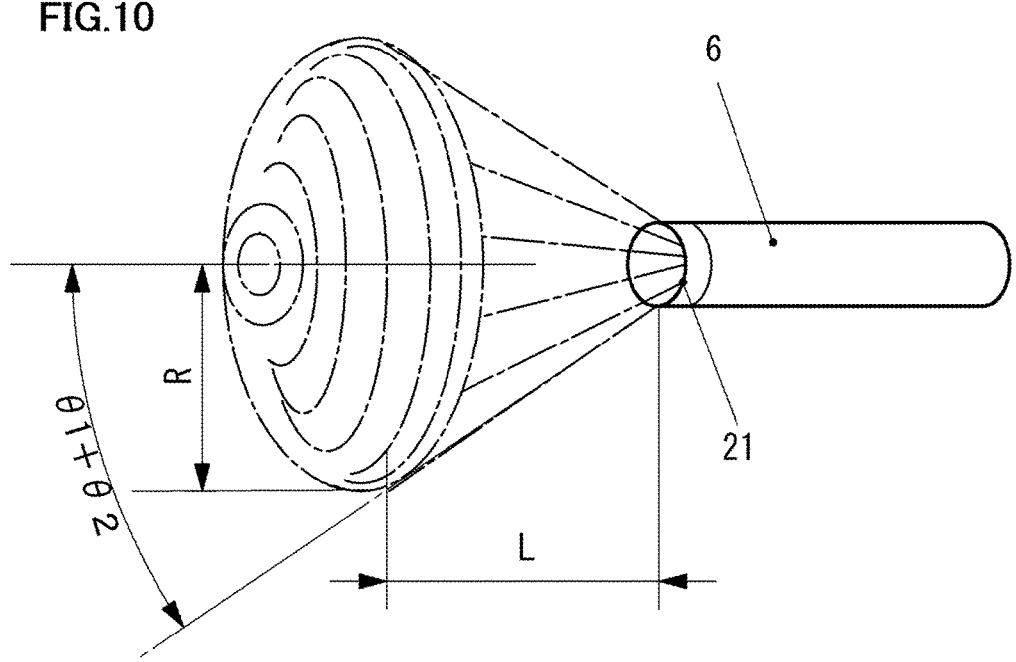
FIG. 10 is a view for describing a three-dimensional scanning area of the optical probe of the optical measurement device of the present invention.

FIG. 10 is a view three-dimensionally showing the light ray emission area. The ray of light is adjusted such that focusing is made within an area of about five millimeters about a position at the front L of the tube 6. Thus, the ray of light is emitted in a substantially conical shape with an angle of (θ1+θ2) in the area with the radius R in the figure, and three-dimensionally scans the target object.

Figure 11:
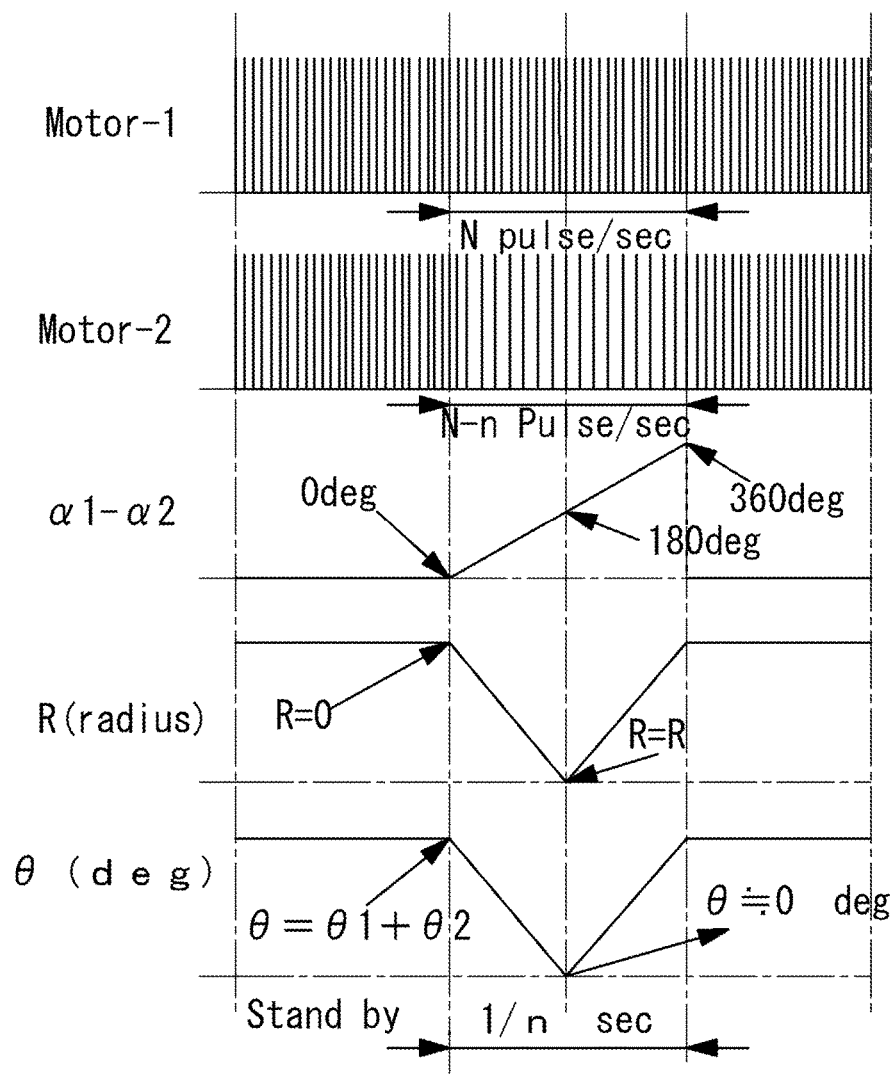
FIG. 11 is a timing chart of operation of the optical probe of the optical measurement device of the present invention.

FIG. 11 is a generated pulse timing chart for the first motor 12 and the second motor 19 of the probe for optical imaging according to the present invention. An upper diagram in the figure shows the pulses generated from the first pulse generation unit 25 of the first motor 12, and a lower diagram in the figure shows the pulses generated from the second pulse generation unit 24 of the second motor 19. The horizontal axis is a time axis.

A time period indicated by "Stand by" in the figure is in such a state that the first motor 12 and the second motor 19 rotate with the same rotation frequency while waiting for a scanning start signal.

Next, when the Start signal is output by operation of an operator of the optical measurement device and the optical probe as illustrated in FIGS. 1 and 2, the first motor 12 simultaneously rotates at a speed (e.g., 30 rotations/second) in terms of, e.g., N pulses/second, thereby beginning storing, in a computer 89, digital observation image data on the measurement target object.

At the same time, the second motor 19 rotates at a speed (e.g., 29 rotations/second) in terms of, e.g., (N−1) pulses/second. Thus, as shown in the figure, the emission angle changes from θ1 to θ2 in 0.5 seconds, and changes back to the angle θ1 again after a lapse of one second. In this manner, three-dimensional light ray emission is completed.

In this case, the computer fetches, in total of two times (two in one set), three-dimensional data within the time of changing the emission angle back and forth between θ1 and θ2 in a single round, thereby obtaining clear three-dimensional image data without a gap. When the data is fetched and stored, the first motor 12 and the second motor 19 are brought into the Stand by state again, and rotate while waiting for a subsequent Start signal.

More practical use of the optical measurement device of the present invention is as follows, for example. A three-dimensional image is fetched by the computer 89, taking, as a trigger, a moment at which the pulse signal from the first pulse generation unit 25, 25a, 25b illustrated in FIG. 4 and the pulse signal from the second pulse generation unit 24, 24a, 24b illustrated in FIG. 5 are both output simultaneously. Then, such an image is displayed on a monitor 90.

In the present embodiment, the stationary-side optical fiber 1 does not rotate, in the long tube 6, across the entire length from the back to the tip end of the tube 6, and therefore, is not fractioned against the tube 6. This can prevent, e.g., a delay in rotation transmission and a torque loss. Moreover, the rotary-side optical fiber 2 is rotatably disposed in a hole of the hollow rotary shaft 10, leading to no sliding loss. Thus, uneven rotation of the first motor 12 is much less caused. On a typical evaluation scale for rotation speed performance, a rotation angle is represented by percentage. In the present invention, a high performance of 0.01% has been achieved.

On the other hand, a typical endoscope probe with friction of an optical fiber has provided only performance with uneven rotation which is more than about 100 times worse than that of the present invention.

The most important performance required for the optical measurement device illustrated in FIGS. 1, 2, 12, and 13 is that the three-dimensional image is obtained and that the geometric accuracy obtained from the digital three-dimensional image data, such as flatness of the deep hole bottom portion of the measurement target object, is enhanced. Factors for variation in measurement of the geometric accuracy include, for example, backlash or vibration of the rotary shaft of the first motor 12 in an axial direction, runout accuracy of the hollow rotary shaft 10 in a radial direction, and accuracy and surface roughness of the first optical path changing unit 3 and the second optical path changing unit 20. Among these factors, slight displacement due to backlash or vibration of the first motor 12 in the axial direction has the greatest influence.

Figure 14:
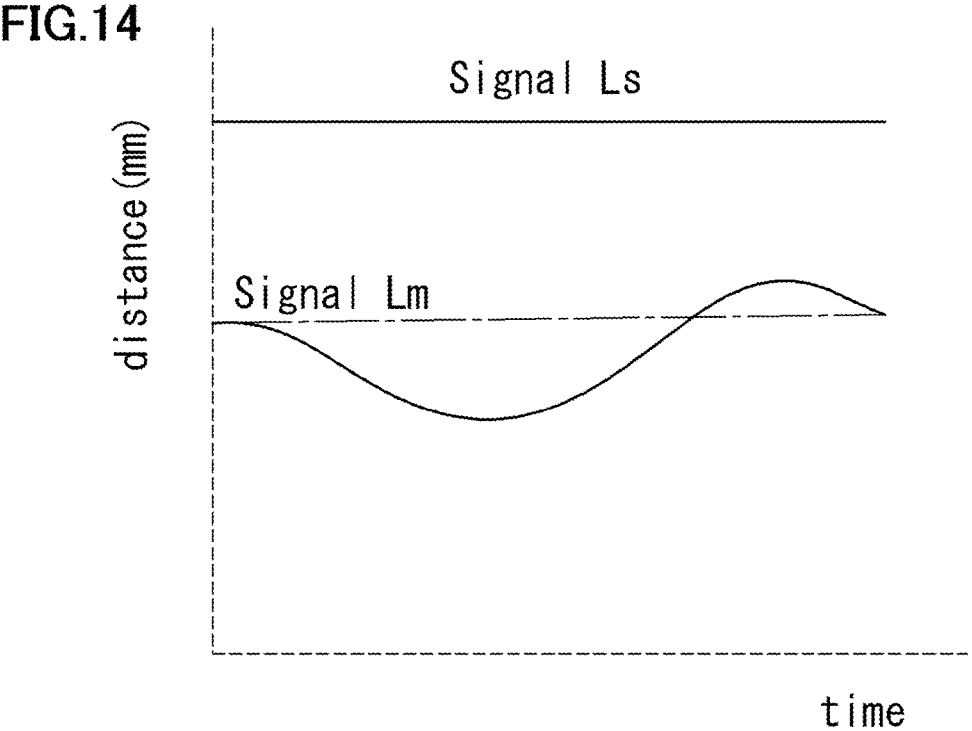
FIG. 14 is a graph of data obtained when there is no vibration of the optical measurement device of the present invention.
Figure 15:
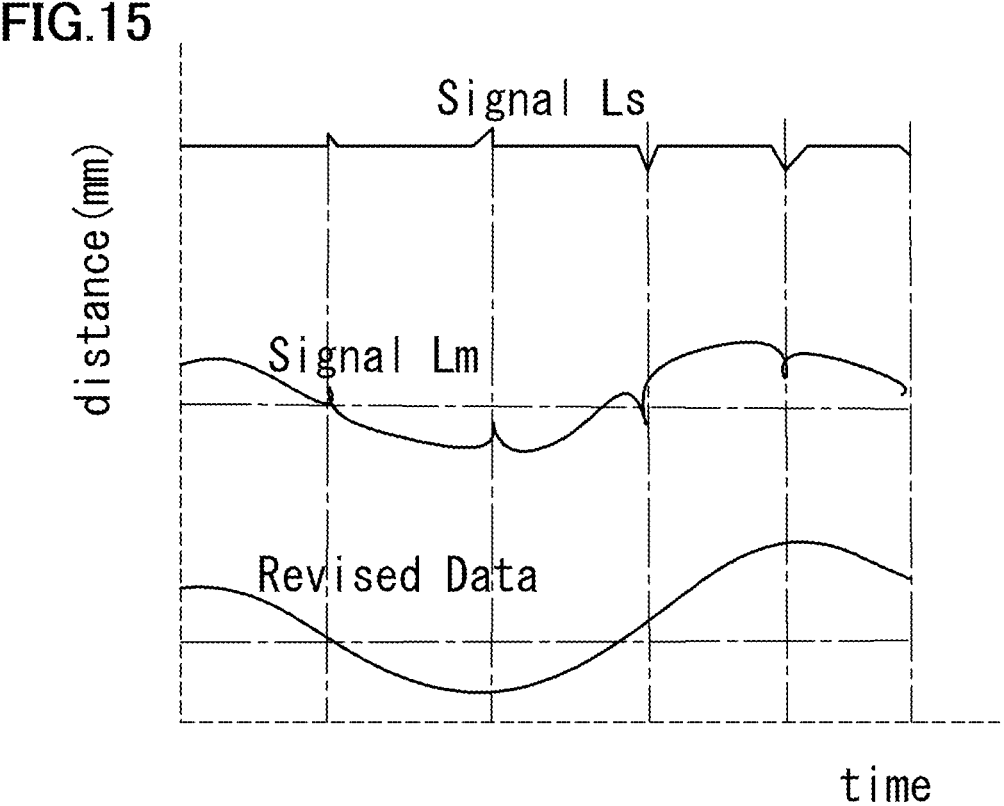
FIG. 15 is a graph of data obtained when there is vibration of the optical measurement device of the present invention.

In FIG. 12, when the optical measurement device detects a signal Lm showing a distance to the bottom portion of the deep hole 27 of the measurement target object 26, no backlash or vibration of the rotary shafts 10, 13 of the first and second motors 12, 19 in the axial direction is caused. When the resultant data of FIG. 14 shows a changeless straight line of a signal Ls showing a measured distance to the translucent reference plate, there is no error or noise in the wave form of the detected Lm and the measured distance, and therefore, Lm indicates a true numerical value.

However, when backlash or vibration of the rotary shafts 10, 13 of the first and second motors 12, 19 of FIG. 12 is caused, the signal Ls showing the measured distance to the translucent reference plate might not show a changeless straight line due to backlash or vibration in the axial direction. In this case, the distance equivalent to the signal Ls is added to the waveform of Lm showing the detected distance to the target object, leading to non-smooth measurement data. For this reason, when (Signal Lm−Signal Ls) is obtained, smooth and accurate data can be obtained as shown in revised data in the figure.

FIG. 13 is for describing a far-red light irradiation area. After the far-red light has passed through the translucent reference plate 21, the entirety of an inner bottom surface of the measurement target object 26 is irradiated with the far-red light. The amount of backlash or vibration of the first and second motors in the axial direction is detected from the measured distance (signal) Lm to the measurement target object and the waveform or change amount of the measured distance (signal) Ls to the translucent reference plate 21. Then, the measured distance (signal) Lm is corrected.

In this state, the method for determining, upon revision, a reference value of the measured distance (signal) Ls to correct the measured distance (signal) Lm and a state upon measurement will be specifically described with reference to FIGS. 16 and 17.

Figure 16:
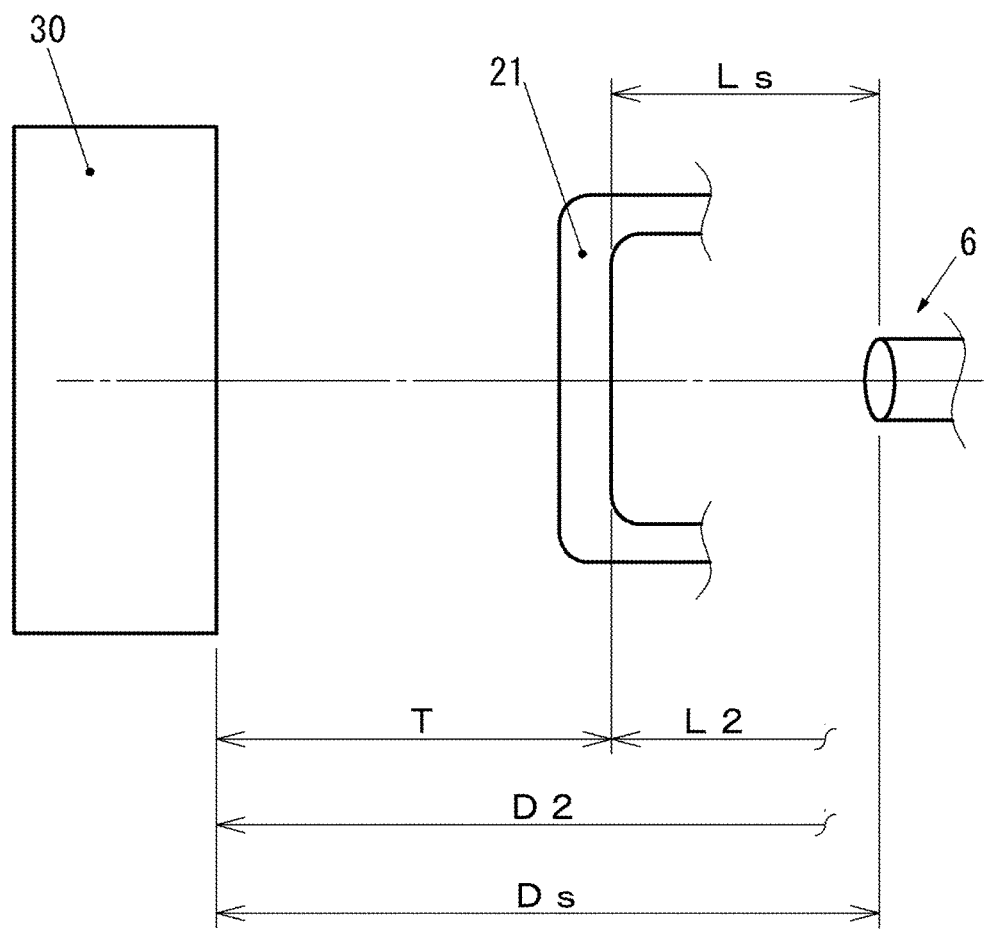
FIG. 16 is a view for describing lengths measured for the optical measurement device of the present invention upon revision.

FIG. 16 is a view for describing each measured dimension upon revision, and FIG. 17 is a view for describing each measurement.

In FIG. 16,

Ds: a given true distance to a revision block 30;

D2: a pre-revised measurement value of each point by the probe; and

L2: a measured distance to the translucent reference plate 21,

Inter-target Distance: T, T=(D2−L2), and

Reference Value of Translucent Reference Plate: Ls, Ls=(Ds−T)

In FIG. 17,

L2: a measured distance to the translucent reference plate 21;

D2: a measured distance to the measurement target object 26;

Corrected True Value to Measurement Target Object 26: D, D=Ls+(D2−L2)=Ls+T, or

Displacement in Axial Direction: (Ls−L2); and

Corrected True Value D: D=D2−(L2−Ls)

The value of Ls for each point of the translucent reference plate 21 is stored in a memory in advance by revision. Upon measurement, D2 and L2 are simultaneously measured so that the corrected value D can be obtained according to the above-described expression.

That is, when the distance to the translucent reference plate 21 is, using the ray of light, three-dimensionally measured, a difference between the reference value obtained in a revision process and the distance to the translucent reference plate upon actual measurement indicates the slight displacement (backlash, vibration) of the entirety of the motor portion in the axial direction. In a specific correction method, the reference value Ls indicating a reference position at each point of the translucent reference plate 21 illustrated in FIG. 16 is obtained in advance in the revision process. Next, upon actual measurement, the true value D, i.e., D =D2−(L2−Ls), is obtained in such a manner that the displacement (Ls−L2) in the axial direction is subtracted from the distance measurement value D2 to each point of the measurement target object 26 of FIG. 17. This algorithm of correction and detection of displacement of the translucent reference plate provided at the front is employed as a displacement detection unit. The true value to each point of the measurement target object 26 as described above is combined to create accurate three-dimensional data on the computer.

In the optical measurement device of the present embodiment, the displacement includes three values of backlash of the first motor 12 in the axial direction, backlash of the second motor 19 in the axial direction, and an axial component of vibration of other rotary portions. The displacement detection unit is configured to detect the total of these three values.

According to the present invention, axial backlash and rotation vibration of the first motor or the second motor can be detected in real time as described above, and a measurement error due to runout of a rotary scanning section can be corrected. Thus, measurement can be made with high accuracy. Moreover, the amount of backlash or vibration in the axial direction can be detected from the waveform or change amount of the measured distance (signal) Ls to the translucent reference plate 21.

INDUSTRIAL APPLICABILITY

The optical measurement device of the present invention is configured to irradiate, with a ray of light, an inner bottom portion of an automobile engine spray nozzle having a deep hole or a slide bearing having a small-diameter hole so that a three-dimensional shape observation image can be obtained and that geometric accuracy such as bottom portion dimensions and flatness can be accurately measured. Specifically, utilization in industrial and medical measurement devices and testing devices is expected.

LIST OF REFERENCE NUMERALS 1, 31 Stationary-side optical fiber
2 Rotary-side optical fiber
3, 3a, 3b First optical path changing unit (prism or lens)
4 Optical fiber fixture
5 Light shielding plate
6 Tube (catheter)
7 Motor coil
8 Motor case
9a, 9b First bearing
10 Hollow rotary shaft
10a Holder portion
11 Rotor magnet
12 First motor
13 Second rotary shaft
14 Vibrator
15 Electrostrictive element
16 Pattern electrode
17, 23 Electric wire
18a, 18b Second bearing
19 Second motor
20, 20a, 20b Second optical path changing unit
20c Collecting lens
20d Prism
21 Translucent reference plate
21a Flat plate portion
22 Rotary optical connector
24, 24a, 24b Second pulse generation unit
25, 25a, 25b First pulse generation unit
26 Measurement target object
27 Deep hole
29 Scanning area
30 Revision block
80 Base
81 Stand
82 Slider
83 Slider motor
84 Connection portion
85 Main body
86 First motor driver circuit
87 Second motor driver circuit
88 Optical coherence analysis section
89 Computer
90 Monitor

The invention claimed is:

1. An optical measurement device configured to three-dimensionally emit a ray of light to obtain a three-dimensional image, the optical measurement device comprising:
   a probe configured to three-dimensionally emit the ray of light from a tip end side of the probe, wherein
   the probe includes
      a translucent reference plate,
      a plurality of motors, each having a rotary shaft, and
      a rotary-side optical fiber and an optical path director, each of the rotary-side optical fiber and the optical path director rotatable with a respective rotary shaft of the plurality of motors, and
   the probe has a displacement detector configured to detect displacement of each rotary shaft in an axial direction thereof.

2. The optical measurement device according to claim 1, wherein
   the displacement detector uses, as a reference value, preset three-dimensional information on a distance to the translucent reference plate, and detects, as a displacement, a difference between an actual measurement value of measured distance data obtained during rotation of each motor and the preset reference value.

3. The optical measurement device according to claim 1, including a second optical path director, wherein an exterior of a main body of the probe is a tube, the plurality of motors includes a first motor and a second motor, the optical path director is configured to rotate together with a rotary shaft of the first motor, and the second optical path director is configured to rotate together with a rotary shaft of the second motor, a stationary-side optical fiber is built in the tube, the stationary-side optical fiber and the rotary-side optical fiber are optically connected together through a rotary optical connector, the optical path director is positioned on a tip end side of the stationary-side optical fiber, and is rotatably driven by the first motor such that the ray of light is rotatably emitted forward with an angle with respect to a rotation center, the second optical path director is integrally disposed on a tip end side of the rotary-side optical fiber, positioned between the stationary-side optical fiber and the optical path director, and rotatably driven by the second motor such that the ray of light is rotatably emitted with an optical path being inclined at an angle with respect to the rotation center and the optical path director is irradiated with the ray of light, and the ray of light is transmitted from the stationary-side optical fiber through the rotary optical connector, the second optical path director, and the optical path director in this order, and then, is emitted forward.

4. The optical measurement device according to claim 3, comprising:

a first pulse generator configured to generate at least one or more pulses in a single rotation according to a rotation angle of the first motor;

a second pulse generator configured to generate at least one or more pulses in a single rotation according to a rotation angle of the second motor; and a computer configured to adjust rotation speeds of the first and second motors based on the pulses from the first and second pulse generators, wherein by rotation made such that a relationship between the rotation speed N1 of the first motor and the rotation speed N2 of the second motor satisfies N2=N1−X [rotations/second], the ray of light is emitted forward from the optical path director at the rotation speed N1 [rotations/second], and an emission angle of the ray of light with respect to the rotation center is changed at a speed X [rounds/second].

5. The optical measurement device according to claim 1, wherein each motor of the plurality of motors is coaxial with at least one other motor of the plurality of motors.

6. An optical measurement method for three-dimensionally emitting a ray of light to obtain a three-dimensional image, comprising:

emitting the ray of light to a testing target through a translucent reference plate while a direction of the ray of light is being changed by driving an optical path changing unit;

obtaining, from reflected light, a signal on a measured distance to the translucent reference plate and a signal on a measured distance to the testing target; and using, as a displacement, a difference between a preset reference value and the signal on the measured distance to the translucent reference plate, thereby correcting the measured distance to the testing target.

* * * * *